Aug. 3, 1937.    H. SACK    2,089,003
FRICTION VARIABLE SPEED GEAR
Filed May 12, 1934    7 Sheets—Sheet 1
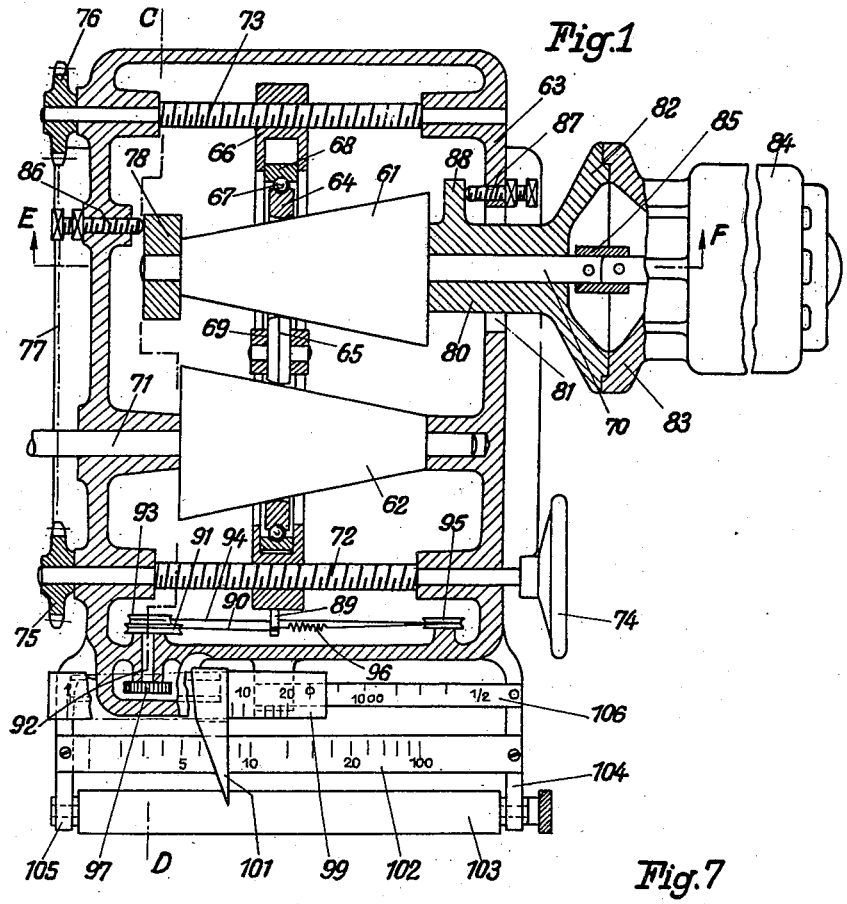
Fig.1
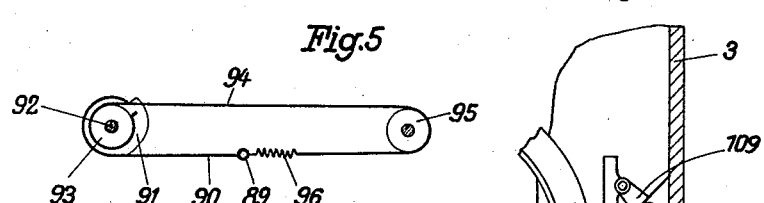
Fig.5
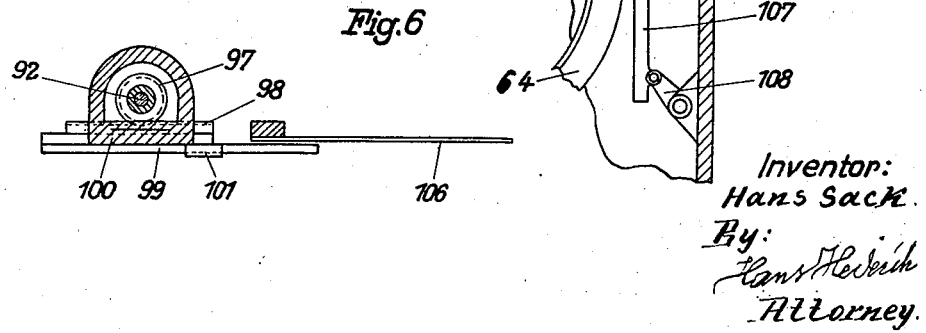
Fig.6
Fig.7
Inventor:
Hans Sack.
By:
Hans Hedrich
Attorney.

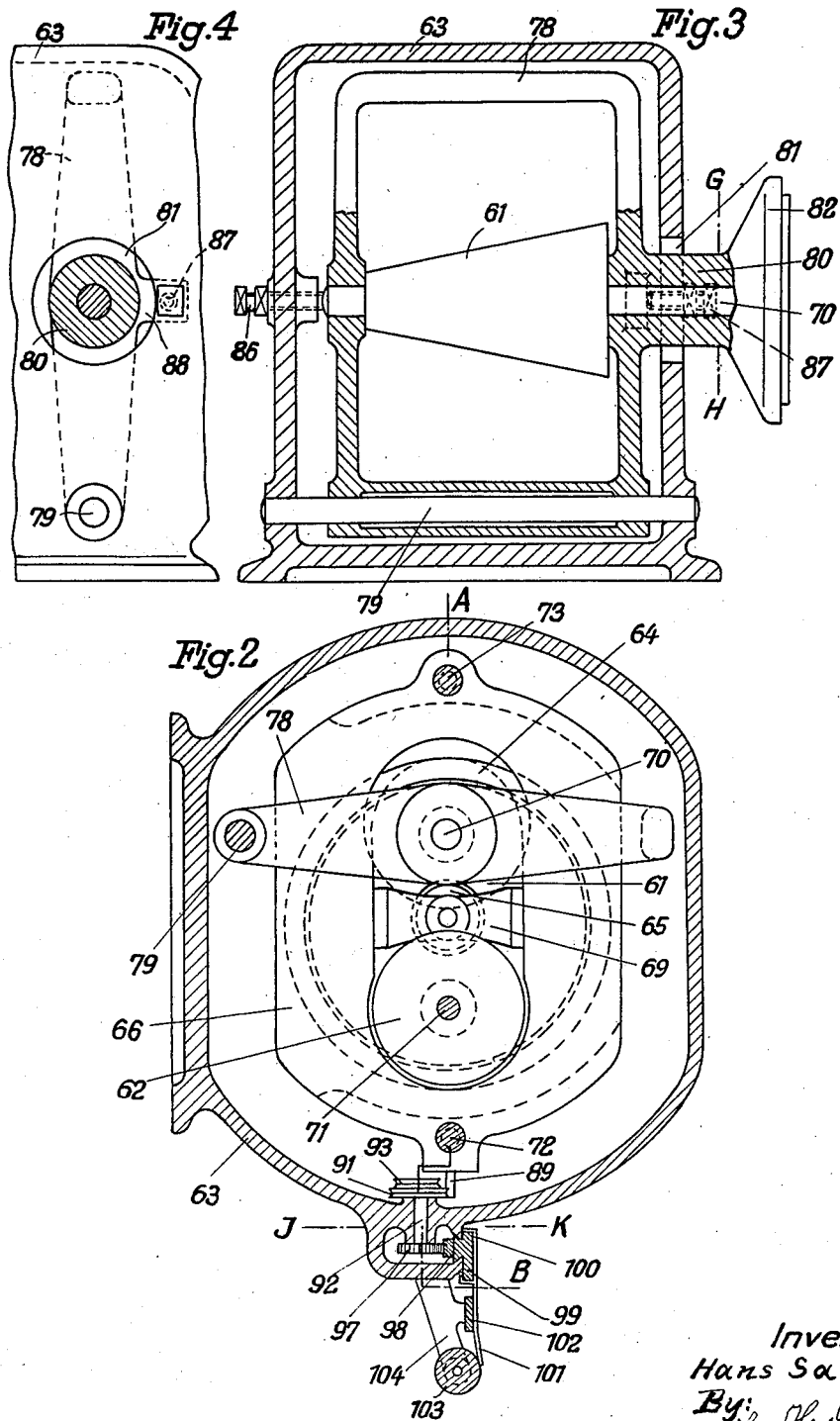

Aug. 3, 1937.  H. SACK  2,089,003
FRICTION VARIABLE SPEED GEAR
Filed May 12, 1934  7 Sheets-Sheet 3

Inventor:
Hans Sack.
By:
Hans Hedrick
Attorney

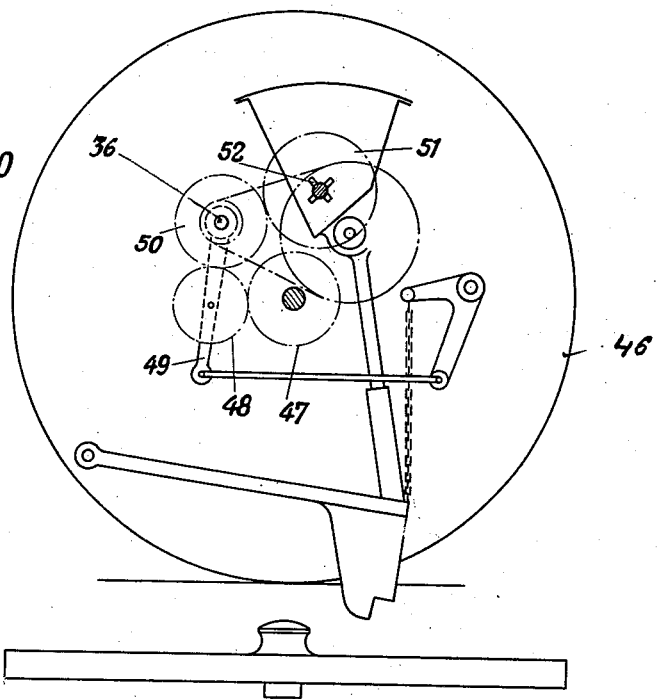
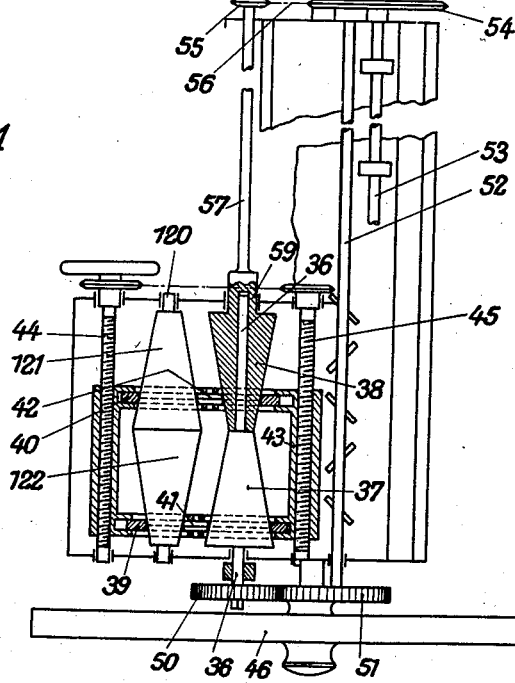

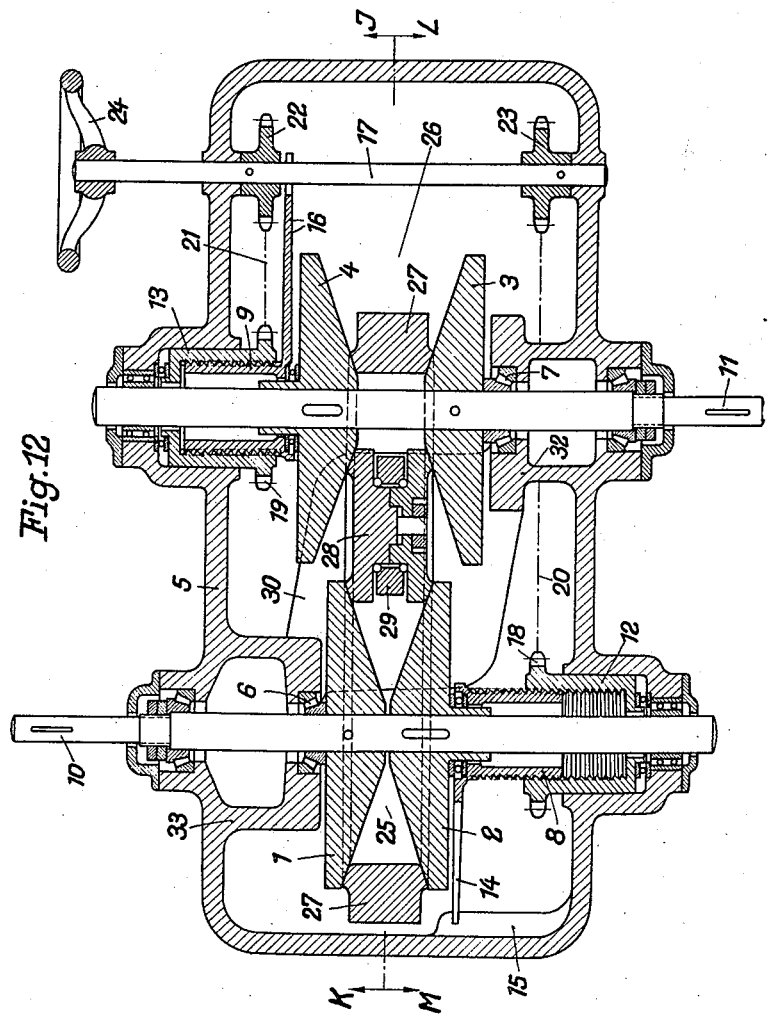

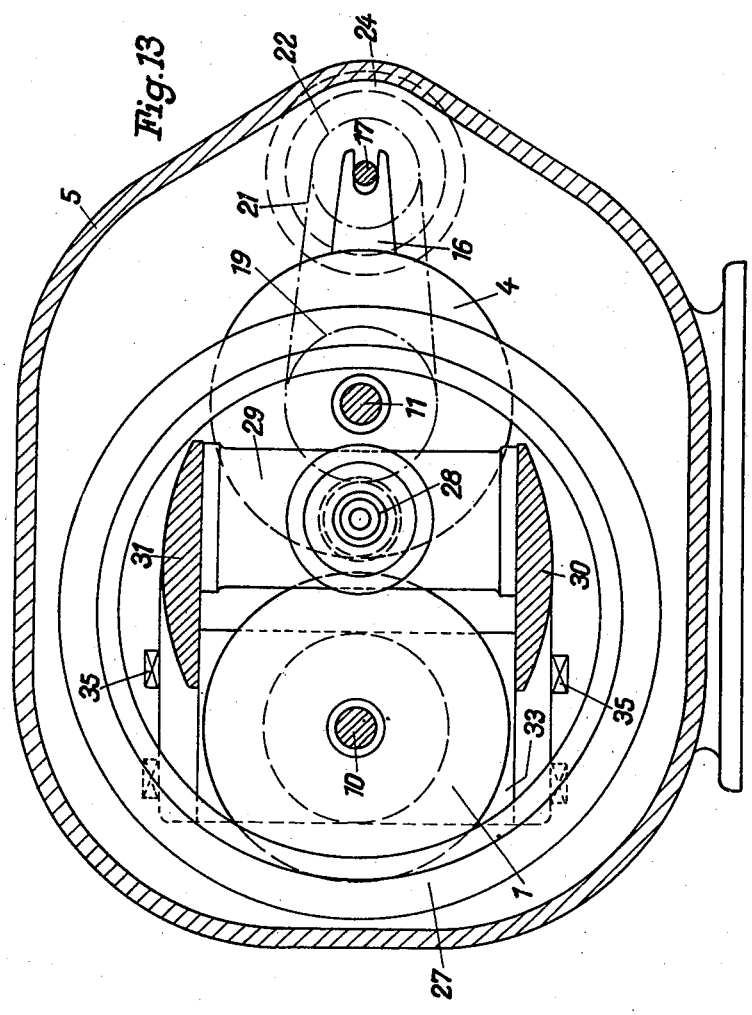

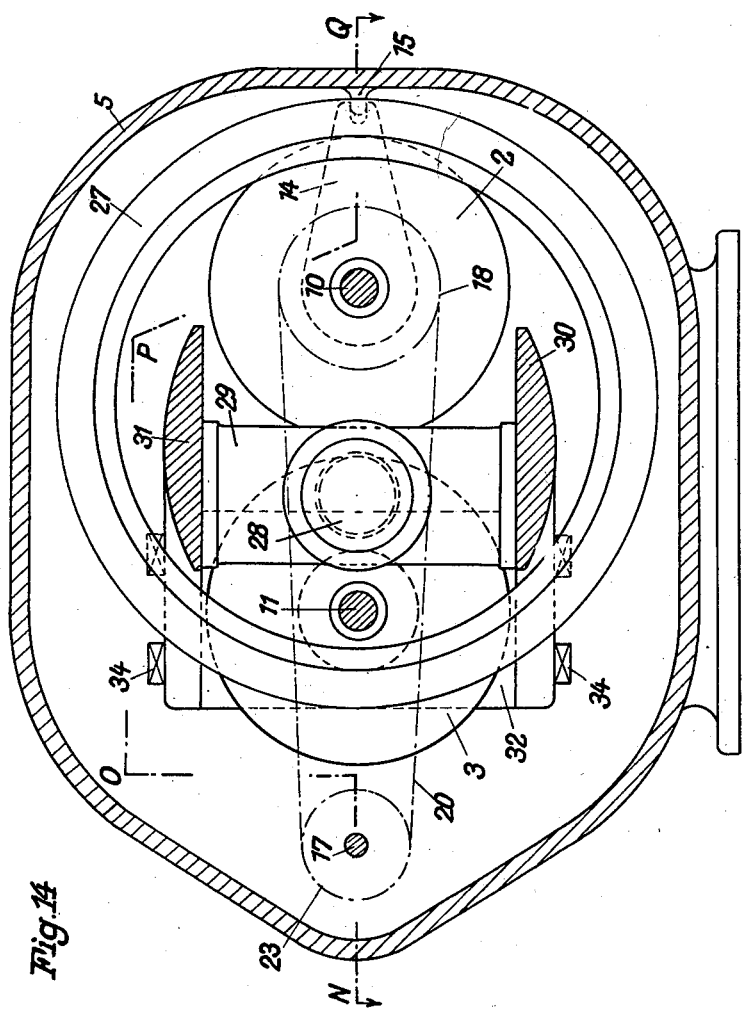

Patented Aug. 3, 1937

2,089,003

UNITED STATES PATENT OFFICE 2,089,003

FRICTION VARIABLE SPEED GEAR

Hans Sack, Leipzig, Germany

Application May 12, 1934, Serial No. 725,253
In Germany May 16, 1933

2 Claims. (Cl. 74—193).

This invention relates to a variable speed gear with friction wheels or, more precisely, with conical friction rollers which are rotatable on parallel axles and of which at least one is not axially shiftable. Said rollers are in contact with rolling bodies which are arranged on the oppositely located sides of the rollers, as well as between them, are shiftable relatively to the rollers, and serve to transmit motion from the one roller to the other. The rolling bodies contacting with the opposite sides of the conical rollers are movable in a plane standing at right angles with respect to the axes of the said rollers.

The invention is illustrated diagrammatically and by way of examples on the accompanying drawings which show a plurality of constructional forms of the gearing. Figure 1 is a vertical transverse section through the first of said constructional forms, only a few parts, especially the rollers, being shown in side-view, the section being taken in the plane A—B of Fig. 2; Figure 2 is likewise a vertical section taken at right angles with respect to Fig. 1 in the plane C—D of the same; Figure 3 is a section in the plane E—F of Fig. 1; Figure 4 is a section in the plane G—H of Fig. 3, seen in the direction from the right to the left, as regards Fig. 3; Figures 5 and 6 show certain details duly treated hereinafter.

Figure 16:
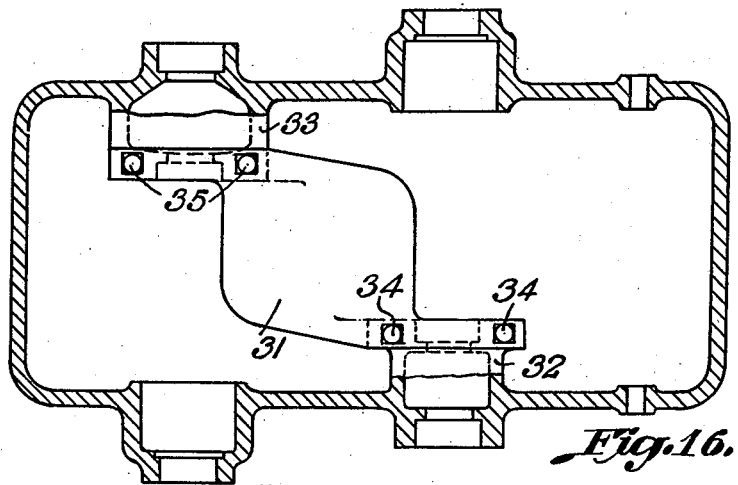
Figure 8:
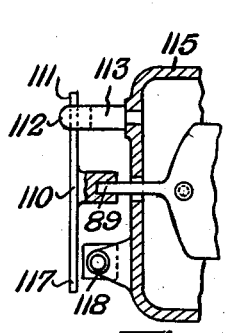
Figure 9:
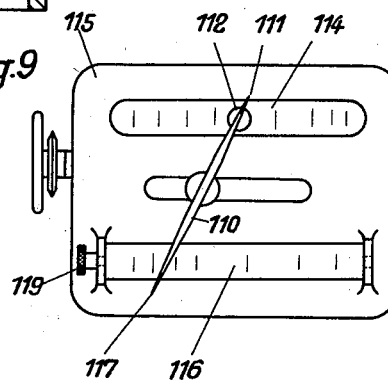
Figure 15:
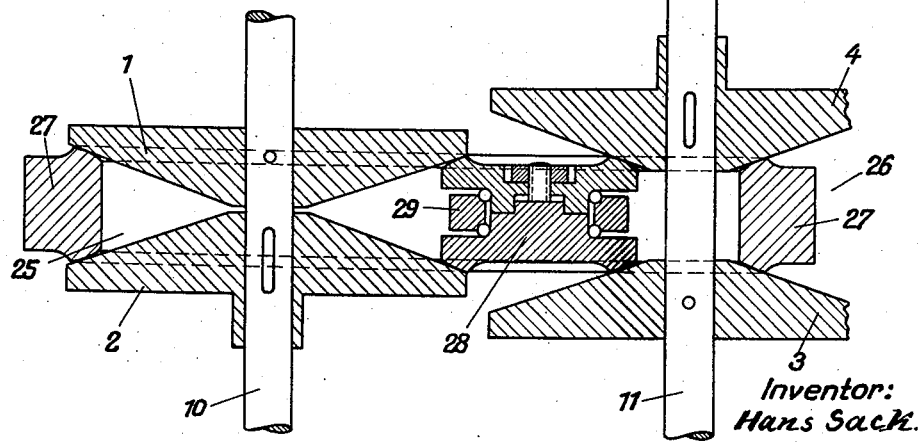

In Figs. 1 and 2 the device is illustrated in connection with certain indicating members. A modification of this indicating device is illustrated in Figs. 8 and 9, Fig. 8 showing the arrangement and combination of the parts partly in side-view and partly in section, and Fig. 9 showing a plan thereof. Figure 10 shows a particular constructional form of the gearing combined with a drill-barrow, the machine being shown partly in full lines and partly in dotted lines. Figure 11 is a plan pertaining to Fig. 10, some parts being shown in horizontal section. Figures 12–16 show a particular constructional form intended for particular purposes and being reduced in axial length; of these figures. Fig. 12 is a section in the plane of the axes of the friction rolls, the members being so adjusted that speeding-down is obtained; Fig. 13 is a section in the plane J—K of Fig. 12; Fig. 14 is a section in the plane L—M of Fig. 12; Figure 15 is a view like the middle portion of Fig. 12, in that only the friction rolls are shown, their position being in this case such a one that speeding-up is obtained; and Figure 16 is a section in the broken plane N—O—P—Q of Fig. 14.

Referring first to Figs. 1–6, 61 and 62 denote two conical rollers or drums, of which the roller or drum 61 is affixed to the driving shaft 70 and the roller or drum 62 is secured to the driven shaft 71. The two drums contact on opposite sides with a friction ring 64 which encompasses them, and between them is a friction ring 65 with which they are likewise in contact. The ring 64 is arranged in a guide casing 66 in which it is movable in a plane standing at right angles with respect to the axes of the shafts 70 and 71. The friction ring 65 is supported in a slide 69 in which it is likewise movable in said plane.

The friction wheel 64 is not in direct contact with the guide casing 66, but in view of the high number of revolutions of the device it is supported therein by the intermediary of balls 67. The ring 68 may slide to and fro in the guide casing 66, but does not take part in the revolution of the ring 64. The balls 67 guide the ring 64 in such a manner that it cannot leave the plane determined by the guide casing 66 in spite of its rotation.

Owing to the rotation of the cone 61 the ring 64 is taken along with it which, in turn, takes along with it the cone 62, that is to say, rotates it, so that the movement of the shaft 70 is transmitted to the shaft 71. Also the inner friction ring 65 takes part in the transmission. The pressure with which the ring 65 is pressed against the two cones is produced by the turning moment to be transmitted which gives rise to a certain shifting of the ring 64. The pressure which this ring exerts upon the cones is taken up, however, not by the bearings of the shafts 70 and 71, but by the friction wheel 65 whereby that pressure is utilized for the transmission of the motion also at two more places, whereas the bearings are relieved.

When the ring 64 and the small wheel 65 are axially shifted, viz, in the direction of the shafts of the cones, the ratio of transmission between the shafts is changed. That shifting is effected by re-adjusting the guide casing 66 by means of threaded spindles 72 and 73, of which 72 is provided with a hand-wheel 74, the rotary motion being transmitted from the spindle 72 to the spindle 73 by means of chain-wheels 75 and 76 and a chain 77.

Changing the ratio of transmission between the two shafts by re-adjusting the guide casing 66 can be effected while the gearing is at a standstill, as at this time the members which are in contact with each other are no more subjected to pressure. This feature renders the gearing particularly suited for certain particular purposes, as for instance for use in connection with drill barrows, viz. for transmitting the rotation of a side-wheel of the drill barrow to the sowing shaft.

When the plane formed by the axle of the cones 61 and 62 is horizontal, the weight of the ring 64, which as above stated is movable a slight distance towards the cones, continually exerts a pressure on the cones. As this ring is slightly elastic a clamping effect will be produced which, when the gearing is at a standstill, can be eliminated by the arrangement illustrated in Fig. 7, the ring 64 being lifted by the plate 107 or by a force exerted on the under side thereof. The plate is connected by two links 108 and 109 to a wall of the gear casing and can be raised and lowered by swinging one of these links by suitable means from the outer side.

The constructional form shown in Figs. 1-4 permits to compensate changes in the dimensions of the friction ring 64 or of the friction wheel 65, if such changes should occur. If, for instance, the friction wheel 65 should become hotter than the ring 64 and expand so much that it exerts upon the shafts a pressure of such a height that the bearings are subjected to an unduly great strain, no damage will thereby be caused owing to the re-adjustability of the transmitting members. It is also possible that the friction wheel is subjected to a greater wear and tear than is the friction ring, the diameter of which is very much larger and the number of revolutions of which is by far less. In this case the bearings of the shafts are not relieved, but the pressure of the friction ring is taken up by said bearings.

In order to render possible in such cases an unobjectionable re-adjustment of the gearing members, as well as to facilitate assembling these members when the gearing is mounted, especially if the friction wheel and the friction ring should have not quite accurate dimensions, one of the two friction cones is adjustable in the direction of its axis and is so supported that the distance between it and the other cone is variable.

The friction cone 62 cannot be shifted in the casing 63, but the friction cone 61 is supported in a frame 78 that is turnable on an axle 79 and is shiftable on the same. The swinging frame 78 has a lug 80 which extends outwardly through an aperture 81 of the wall of the casing 63. At the lug or extension 80 is a flange 82, to which an electric motor 84 is affixed by the intermediary of a flange 83 made integral with the casing of the motor. The aperture 81 is packed by means of a leather cup (not shown) so as to cover and close said aperture, and no oil can escape from out of the interior of the main casing. The shaft of the electric motor is connected with the shaft 70 of the conical drum 61 by means of a coupling 85.

In the wall of the casing 63 are two abutment screws 86 and 87. The screw 86 is in direct contact with the frame 78 and the screw 87 contacts directly with a lug 88 of the frame 78. Said two screws which can be secured in their adjusted position by counter nuts render it possible to re-adjust the swinging frame 78 in the direction of the axis of the drum 61 without preventing it from being turned on the axle 79. Simultaneously with the frame 78 the conical drum 61 which is supported therein is shifted. It is in this way possible to obtain the proper position of the gearing members, when assembling them, in a very simple manner, as well as to re-establish that position if it should no more exist.

The guide casing 66 has a pin 89 by which the indication of the ratio of transmission with which the shaft 71 is driven by the shaft 70 is transmitted. At the pin 89 is a pulling member, for instance a thin wire rope 90, connected with one of its ends, whereas its other end is firmly connected with a rope pulley 91. When the guide casing is moved in such a direction that it is moved away from the pulley 91, the rope is being drawn off from the same, whereby the axle 92 to which the rope pulley 91 is affixed is rotated, as is also the rope pulley 93. This pulley is connected with one end of a rope 94 which passes over the rotatory disk 95 and is then connected with a pin 80, there being inserted a small compensation spring 96, as shown in Fig. 5. The ropes 90 and 94 extend around the pulleys 91 and 94 in opposite directions so that while the rope 90 is being drawn off from the pulley 91, the rope 93 is being wound on the pulley 94.

The circumferential shape of the pulley 91 may deviate from the circular shape (Fig. 5) in order to establish a corresponding relation between the extent of the shifting of the pin 89 (Fig. 1) and the rotation of the disk 91, as effected by the pulley 91. The pulley or disk 93 may, however, be of circular shape. The differences in the movements of the ropes 90 and 91, as brought about by the different circumferential shapes of the disks or pulleys in question, are compensated by the spring 96.

On the shaft 92 is a cog-wheel 97 which meshes with a rack 98 (Fig. 6) firmly connected with a graduated scale 99 shiftable in a guide member 100 at the casing 63; the scale is a logarithmic one. On it is adjustable the pointer 101 which cooperates also with a graduated scale 102 firmly attached to the casing 63 and being likewise a logarithmic one.

The logarithmic scales present the possibility to read not only the number of revolutions of the driven shaft at the indicating device connected with the gearing, but also the circumferential speed of a body located upon this shaft, as for instance the cutting speed of a drill, if the gearing is employed for driving a drill machine. If the scale 99 indicates the logarithm of the diameter of the drill, the cutting speed of that drill can be read at the scale 102.

It has been discovered that the shifting of the friction ring 64 and of the friction wheel 65 is nearly accurately proportional to the logarithm of the number of revolutions of the driven shaft 71 if the shaft 70 is driven with a constant number of revolutions. It is, therefore, not necessary to deduce, by the intermediary of suitable means, from the shifting of the guide casing 66 a movement in which the covered ways are proportional to the logarithm of the number of revolutions of the shaft 71; suitable means may be, for instance, a cam disk located upon an adjusting plate or a pulling rope drawn off from a drum with non-circular circumference in rectilinear direction, as illustrated in the drawings.

In order to render the gearing utilizable especially for work-shops, there may be provided at it a roller 103 (Fig. 1) supported at the main casing in lugs 104 and 105. Said roller is, of course, rotatory, but cannot be axially shifted. On that roller the cutting speeds prescribed for the several materials and for the tools to be used when working them, can be indicated in colors. It is then only necessary to turn the hand-wheel 74 until the pointer 101 stands within the cutting speed range marked upon the roller 103.

Furthermore, a graduated scale 106 may be firmly secured to the gearing casing, and the scale 98 may be shiftable on that additional scale. The number of revolutions of the tool spindle may then be read at the scale 98, but the ascertainment of this number is not particularly important if merely the adjustment of the gearing to a certain rotatory speed is concerned.

Theoretically, the readjustment of the conical friction drum 61 should be effected in such a manner that the axis of this drum is moved in a definite plane determined by the axes of the two friction drums, but it has been found that it is sufficient to arrange the drum 61 in such a manner that its axis is movable in a cylindrical surface if this surface contacts with the plane formed by the two drum axes in a middle position of the same.

Figs. 8 and 9 show a modified construction of an indicating device by means of which the extent of the shifting of the lug pin 89 provided at the guide casing 66 can be recognized. This indicating device is designed in the form of a nomographic computing table, with the aid of which variations in the operation of a device actuated by the gearing and being subject to variations of the ratio of transmission according to the various conditions can be read.

The lug pin 89 of the guide casing 66 constitutes a pivot carrying a turnable pointer 110. The end 111 of this pointer is shiftable in a slot of a head 112 that is turnable relatively to a pin 113 which can be put, at several places of the nomographic table 114, into a bore provided in the the wall of the casing. The table 114 can, for instance, indicate the pressure against which a rotatory compressor connected with the gearing must convey a compressible gas, whereas the scale 116 over which the end 117 of the pointer 110 is movable indicates the amount of the gas conveyed. The scale 116 may be provided, in common with scales corresponding to different temperatures, on a prismatic support or carrier 118 which can so be turned by means of a head 119 that any of said scales can be moved below the end 117 of the pointer 110. It is in this way possible to reduce to the normal state the amount of gas conveyed for different end temperatures of that gas.

In Figs. 10 and 11 is shown a constructional form which is distinguished by its particularly great regulating range. In these figures the gearing is shown in connection with a drill-barrow and fertilizer. As in this case no readjustment of the conical frictional drums is necessary, these drums are not shiftably located, as appears from Fig. 11. But they are double drums, as likewise represented in this figure. The drum or double drum 121, 122 is located on the shaft 120, the two drum portions being united with one another at their largest diameters. The drum portion 122 cooperates with the drum portion 37 of a double drum 37, 38 which is the reverse of the other double drum, the portion 38 of the drum is rotatable about the shaft 36 and this portion 38 cooperates with the portion 121 of the other double drum which is loosely rotatable on the axle or shaft 120. The transmission from the drum 37, 38 to the drum 121, 122 is effected by friction rings 39 and 40 and by friction wheels 41 and 42, all this practically in the same manner as in Figs. 1–4. The guide members of the friction rings and the friction wheels are connected with one another in such a manner as to form a casing 43 which can be readjusted by means of the spindles 44 and 45.

In order to increase the ratio of transmission still more than is the case in Fig. 11, it is possible to make use of a plurality of double drums for instance in this way that a double drum like 121, 122 is connected with the drum 37, 38 at the one or the other end thereof, where the diameter is the greatest, the additional drum cooperating then also with a friction roll which, in turn, contacts with a fourth drum like the drum 37, 38 whereby the ratio of transmission will be considerably enlarged.

It can also be seen from Fig. 11 how the gearing is mounted in a drill barrow or fertilizer. 46 denotes one of the running wheels of the machine which is firmly connected with the cog-wheel 47 (Fig. 10) that can be brought into mesh with a cog-wheel 48 supported in a link 49 suspended from the shaft 36 of the double-drum 37, 38. This drum is connected with the cog-wheel 50 which meshes continually with the wheel 48. The wheel 50 meshes continually with the cog-wheel 51 secured to the shaft 52 extending through the seed-box and being provided with the usual stirring blades, as indicated in Fig. 10. The seeding shaft 53, Fig. 11, is rotated by means of the chain-wheels 54 and 55 and the chain 56. The wheel 55 is affixed to a shaft 57 connected by means of a hollow lug 59 encompassing the shaft 36 with the friction drum portion 38.

Separating the drive of the seed shaft from the stirring shaft presents the advantage that the power requisite to rotate the stirring shaft need not be transmitted by the intermediary of the regulable gearing in which there are no steps, but which is relieved from undue strain, in that the stirring wheel requires by far more power than the seeding shaft. Besides, too slow rotation of the stirring shaft, as would be the case if the two shafts had a common drive is obviated.

In the further example shown in Figs. 12–16, the friction bodies are designed as disks, that is to say, conical disks, of which there are two pairs, viz., 1 and 2, and 3 and 4. The apexes of the conical disks of each pair lie opposite to one another, as appears from Fig. 12, and one disk of each pair is axially shiftable on the appertaining shaft. The disk 2 is shiftable on the shaft 10 and the disk 4 is shiftable on the shaft 11, both in opposite directions.

5 denotes the casing enclosing the gearing and 6 and 7 are axial bearings located in said casing, the bearing 6 contacting with the unshiftable disk 1 and the bearing 7 contacting with the unshiftable disk 3. The other disks (1 and 3) contact with ball bearings held by sleeves 8 and 9 which are threaded on their outer circumferential surface, the threads engaging interior threads of sleeves 12 and 13 supported in the suitably shaped side-walls of the casing. The sleeves 8 and 9 are prevented from turning by means of arms 14 and 16 extending laterally forth from them, as shown in Fig. 12. Each of these arms is forked at its free end, the fork of the arm 14 engaging a stationary ledge 15 provided in the interior of the casing, and the fork of the arm 16 engaging a shaft or spindle 17 supported in said casing.

The sleeves 12 and 13 can be rotated by means of chain wheels 18 and 19 made integral with them, and by means of chain-wheels 22 and 23 secured to the axle or shaft 17. 20 and 21 are the chains connecting the several chain wheels with one another. The shaft or axle 17 can be turned by means of a hand-wheel 24. Owing to the sleeves 8 and 12, as well as 9 and 13, being coupled with one another by the threads, as described, the sleeves 8 and 9 will be moved axially in the one or the other direction according to the direction of rotation of the sleeves 12 and 13 by the chain-wheel gearings. The axial motion of the sleeves 8 and 9 is transmitted to the shiftable conical disks 2 and 4, as will be clear without a further explanation.

The two disks of each pair of disks form between them a groove 25, or 26 respectively, and between the two grooves is located a rolling body 28, whereas a rolling ring 27 encompasses the grooves in the manner shown in Fig. 12, this ring engaging the one groove where it is largest (left-hand portion of Fig. 12) and the other groove where it is narrowest (right-hand portion of Fig. 12), this portion being located counter to the other one. The annular faces where the rolling body 28 and the rolling ring 27 contact with the conical disks are correspondingly conical, but preferably they are a little rounded off, as in Fig. 12. The rotation of the shaft 10 is transmitted to the shaft 11 by the intermediary of the conical disks and said rolling members 27 and 28.

The rolling member 28 is preferably bipartite, as in Fig. 12, and is supported in a slide 29 (Fig. 13) that can be shifted between guide cheeks 30 and 31 in the direction from the one pair of the conical disks to the other pair thereof. The guide cheeks 30 and 31 are affixed to the members 32 and 33 which are parts of the bearings by screws 34 and 35 (Figs. 13 and 14). Said cheeks pass through the ring 27 in such a manner that they never contact with it whichever its position may be (compare Figs. 13 and 14).

Owing to the rolling body being guided in the manner and by the members described, the axis of rotation of said body remains always in the plane of the shafts 10 and 11, and by the said body being always in contact with the conical drums, whichever position they may have, its axis of rotation lies always parallel to the axis of the driving shaft, or of both shafts respectively. The rolling ring 27 is so guided by the conical drums that its axis of rotation is likewise always parallel to said shaft or shafts, but there is a certain possibility that it can deviate a little, under circumstances, from the plane of the two shafts.

In the position of the movable parts shown in Fig. 12 the rolling body and the rolling ring contact with the conical drums 1 and 2 where their diameter is the largest, and the reverse is the case as regards the conical drums 3 and 4. It results therefrom that the shaft 11 rotates correspondingly quicker than the shaft 10. If, however, the conical drums are axially moved, by the above described members, so much that they assume the position shown in Fig. 14 the rolling body 28 and the rolling ring 27 contact with the conical drums 3 and 4 where there is the largest diameter of the same, as shown in said Fig. 14. Now the shaft 11 will run considerably slower than the shaft 10, as intended.

The axial length of the rolling body 28 is the same as the axial length of the rolling ring 27, so that they contact with the conical bodies always at points which lie accurately diametrically opposite to one another, that is to say, the distance between the drum places which are in contact with said members 27 and 28 is always the same.

I claim:

1. A friction variable speed gear, comprising in combination a driving shaft, a conical drum on and affixed to said driving shaft, a driven shaft extending parallel to said driving shaft at a distance therefrom, a conical drum on and affixed to said driven shaft and tapering in the opposite direction to said first mentioned drum and forming a gap therewith, a rigid ring encompassing said two drums and bearing against opposite points thereof, said ring adapted to be rotated by the drum on said driving shaft and thereby rotate the drum on said driven shaft, a guide casing adapted to receive said ring, said ring being freely shiftable within said guide casing transversely to the axis of said drums but not in the direction of said axis, interconnected screw spindles parallel with said axis and adapted to move said guide casing and therewith said ring and to vary thereby the ratio of transmission between said drums.

2. A friction variable-speed gear as specified in claim 1, in combination with a friction roller, mounted in said casing between said drums and adapted to move within said casing transversely to the axis of said drums but not in the direction of said axis.

HANS SACK.